United States Patent [19]

Perron et al.

[11] Patent Number: 5,187,228

[45] Date of Patent: Feb. 16, 1993

[54] STABILIZER FOR COMPATIBILIZED POLYCARBONATE AND POLYAMIDE POLYMER BLENDS

[75] Inventors: Peter J. Perron; Khemchand Nangrani, both of Arlington; Ed Bourbonais, Houston, all of Tex.

[73] Assignee: Dexter Corporation, Windsor Locks, Conn.

[21] Appl. No.: 673,876

[22] Filed: Mar. 22, 1991

Related U.S. Application Data

[60] Continuation-in-part of Ser. No. 254,542, Oct. 6, 1988, Pat. No. 5,019,625, which is a division of Ser. No. 95,497, Sep. 10, 1987, Pat. No. 4,782,114, which is a continuation-in-part of Ser. No. 915,239, Oct. 3, 1986, abandoned.

[51] Int. Cl.$^5$ .................... C08L 69/00; C08L 77/00
[52] U.S. Cl. ........................................ 525/66; 525/67; 525/92; 525/133; 525/424; 525/425; 525/426; 525/430; 525/433; 524/114
[58] Field of Search .................... 524/114; 525/66, 67, 525/92, 133, 424, 425, 426, 430, 433

[56] References Cited

U.S. PATENT DOCUMENTS

| | | | |
|---|---|---|---|
| 3,250,823 | 5/1966 | Zeitlin | 525/66 X |
| 3,431,224 | 3/1969 | Goldblum | 525/433 X |
| 3,801,673 | 4/1974 | O'Connell | 525/931 X |
| 4,041,103 | 8/1977 | Davison et al. | 260/857 D |
| 4,066,611 | 1/1978 | Axelrod | 524/114 |
| 4,085,163 | 4/1978 | Gerger et al. | 260/857 D |
| 4,086,295 | 4/1978 | Mori | 525/433 |
| 4,088,627 | 5/1978 | Gerger et al. | 260/42.18 |
| 4,107,131 | 8/1978 | Gerger et al. | 525/96 X |
| 4,129,715 | 12/1978 | Chen et al. | 528/67 |
| 4,174,358 | 11/1979 | Epstein | 525/183 |
| 4,251,642 | 2/1981 | Tan et al. | 525/66 |
| 4,254,232 | 3/1981 | Mueller | 525/66 |
| 4,283,502 | 8/1981 | Richardson | 525/66 |
| 4,304,881 | 12/1981 | Aoki et al. | 525/66 |
| 4,307,207 | 12/1981 | Wiggins et al. | 525/66 |
| 4,317,891 | 3/1982 | Sakano et al. | 525/66 |
| 4,328,331 | 5/1982 | Chen et al. | 528/288 |
| 4,338,413 | 7/1982 | Coran et al. | 525/179 |
| 4,339,555 | 7/1982 | Ohmura et al. | 525/66 |
| 4,381,371 | 4/1983 | Nielinger et al. | 525/66 |
| 4,387,184 | 6/1983 | Coquard et al. | 525/183 |
| 4,393,168 | 7/1983 | Giles | 525/66 |
| 4,423,185 | 12/1983 | Matsumoto | 525/66 |
| 4,448,937 | 5/1984 | Bopp | 525/432 |
| 4,478,978 | 10/1984 | Roura | 525/66 |
| 4,525,531 | 6/1985 | Zukosky et al. | 525/92 |
| 4,537,929 | 8/1985 | Nangrani | 524/504 |
| 4,584,344 | 4/1986 | Baer | 525/66 |
| 4,587,297 | 5/1986 | Walker et al. | 525/64 |
| 4,594,386 | 6/1986 | Olivier | 525/66 |
| 4,634,737 | 1/1987 | Liu et al. | 525/146 |
| 4,656,228 | 4/1987 | Richter et al. | 525/433 |
| 4,716,198 | 12/1987 | Murabayashi | 525/66 |
| 4,767,811 | 8/1988 | Torre | 525/430 |
| 4,782,114 | 11/1988 | Perron | 525/66 |
| 4,788,248 | 11/1988 | Maresca et al. | 525/66 |
| 4,788,249 | 11/1988 | Maresca | 525/66 |
| 4,861,815 | 8/1989 | Schultz | 525/430 |

FOREIGN PATENT DOCUMENTS

| | | |
|---|---|---|
| 886134 | 5/1981 | Belgium . |
| 125739 | 11/1984 | European Pat. Off. . |
| 131188 | 1/1985 | European Pat. Off. . |
| 148743 | 7/1985 | European Pat. Off. . |
| 149091 | 7/1985 | European Pat. Off. . |
| 183116 | 6/1986 | European Pat. Off. . |
| 188683 | 7/1986 | European Pat. Off. . |
| 227053 | 7/1986 | European Pat. Off. . |
| 3444096 | 6/1985 | Fed. Rep. of Germany . |
| 3605573 | 8/1987 | Fed. Rep. of Germany . |
| 50-85651 | 7/1975 | Japan . |
| 58-8760 | 1/1983 | Japan . |
| 58-71952 | 4/1983 | Japan . |
| 58-447 | 4/1985 | Japan . |
| 62-64864 | 3/1987 | Japan . |
| WO84/03894 | 11/1984 | PCT Int'l Appl. . |
| WO84/04752 | 12/1984 | PCT Int'l Appl. . |
| 1037776 | 8/1966 | United Kingdom . |
| 1363402 | 8/1974 | United Kingdom . |

OTHER PUBLICATIONS

Estamid 90A, Upjohn Elastomers, 5 pages.
Compatibilizers: Blending More Perfect Unions, Plastics Compounding, Sep./Oct. 1986, pp. 20–23.

*Primary Examiner*—David J. Buttner
*Attorney, Agent, or Firm*—Pennie & Edmonds

[57] ABSTRACT

A monoglycidyl stabilized polycarbonate and polyamide blend comprising a polycarbonate, a polyamide, a polymeric compatabilizing agent and a monoglycidyl compatabilizing agent is provided wherein the monoglycidyl stabilizer effectively end caps the polyamide without cross linking polymer chains. The polymeric compatabilizing agent comprises a polyetherimide, a polyurethane, a linear segmented thermoplastic elastomer having an ester segment and a hard segment of semi-crystalline, partially aromatic polyamide based on diphenylmethane diisocyanate, hydroxyl containing phenoxypolymers, polyamide-polyarylate block copolymers, polyamide-polyester block copolymers, or blends thereof. The polycarbonate and polyamide blend may further comprise an impact modifying agent or an alloying agent.

24 Claims, No Drawings ial in which these compatablizing agents are used. In
STABILIZER FOR COMPATIBILIZED POLYCARBONATE AND POLYAMIDE POLYMER BLENDS

CROSS REFERENCE TO RELATED APPLICATIONS

This application is a continuation-in-part of application Ser. No. 254,542, filed Oct. 6, 1988 now U.S. Pat. No. 5,019,625, which is a division of application Ser. No. 95,497, filed Sep. 10, 1987, now U.S. Pat. No. 4,782,114, which is a continuation-in-part of application Ser. No. 915,239, filed Oct. 3, 1986, abandoned.

TECHNICAL FIELD

The present invention relates generally to a stabilizer compound for use with a compatibilizing agent for polymeric blends of polycarbonates and polyamides wherein the melt compounded blend has improved physical and chemical properties.

BACKGROUND ART

Polymeric resins have long been known for their chemical and physical properties. Molded or extruded resins have found numerous applications, such as in appliances, consumer products, electronics, machine components, automotive parts and the like. However, the physical and chemical properties of the polymeric resins, and thus the components or articles fabricated therefrom, vary widely depending upon the chemical structure of the main chain or backbone of the polymeric resins, as well as the molecular weight of such polymeric resins.

For example, polycarbonate resins are known to possess desired heat distortion temperatures, but suffer in that such polymeric resins, and thus articles molded or extruded therefrom, generally possess low chemical resistance to solvents, low stress crack resistance, and low impact strength when thick sections of the polymer are required or utilized. On the other hand, polymeric resins, such as the polyamides (i.e. the nylons), are known to be chemically resistant to a large number of solvents, and to have a desired degree of toughness and abrasion resistance. However, the polyamide polymers also possess certain inherent disadvantages, unless modified, such as relatively low impact strength, a low heat distortion temperature, and ., an affinity to pick up moisture.

In order to modify the properties of polymeric resins, mixtures of selected polymeric resins have been utilized to form blends. However, in many cases, such as with polycarbonate and polyamide resins, such resins are incompatible. Attempts to render such resinous materials compatible have generally involved expensive chemical compatabilizing compounds or process conditions, and even then the resulting resinous blend often does not possess the desired properties.

Compatabilizing compounds of the past have comprised compounds containing carboxylic acid. These carboxylic acid compounds are corrosive to the molding equipment utilized in processing the polymeric material in which these compatablizing agents are used. In addition, compatabilizers containing carboxylic acids do not retain paint adhesive properties when painted polymer blends utilizing these compatabilizers are exposed to high levels of humidity. A non-corrosive compatabilizing agent which does not contain a carboxylic acid would be desireable.

Stabilizing agents are well known in the art and may be utilized to end cap the polyamide component of a polymeric blend. Such stabilization is desireable in that the overall stability of the polymeric blend may thus be maintained. Although stabilizing agents, such as the diglycidyl epoxides have been efficient in terminating polyamide chain propogation, these epoxides cross-link proximate polymers and thus increase the molecular weight of the blends which incorporate them. Increased molecular weight of the blend decreases flow rate at a given processing temperature and requires increased temperature, and thus energy expenditures to achieve a satisfactory flow. A stabilizing agent which does not exhibit cross-linking of the polymer blend, and thus increases processing efficiency is needed.

Polycarbonate and polyamide blends may be utilized in a mold process applications, such as injection molding, whereby finely detailed or acutely angled areas of a mold must be substantially filled with such blends. Such molds necessitate a low viscosity blend whereby increased flow rates are provided so as to allow such areas to be filled. Increasing the processing temperature of the blend is often necessary to acheive a low viscosity so as to provide the required flow. Stabilizers of the past have been unable to retain polycarbonate and polyamide blend toughness, or impact strength after said blend had been exposed to the increased processing temperatures required in these finely detailed molding applications. It would be desireable to discover a stabilizing agent for such blends which would allow increased temperature processing of said blend without the loss of blend impact strength.

Polyamide polycarbonate blends of the past have benefited from impact strength provided by the polyamide. However, these blends have exhibited rather poor low temperature impact resistance. Impact modifying agents have been utilized in the past to increase the toughness of the blend, but these agents have not optimized low temperature impact strength. An impact agent which imparts increased low temperature impact strength to polyamide polycarbonate blends is needed.

SUMMARY OF THE INVENTION

An object of the present invention is to provide a stabilizing agent so as to effectively end cap the polyamide component of a polycarbonate and polyamide blend without increasing blend molecular weight due to cross linking, while additionally allowing the blend to retain impact strength after increased temperature processing.

A further object of the present invention is to provide a compatibilizing agent for polycarbonate and polyamide resins which thus enables an improved polymeric blend of these materials to be obtained without a substantial sacrifice of the desirable properties of each of the resins employed in the blend. It is an additional object of the present invention to provide a non-corrosive compatibilizing agent which provides increased paint adhesion for the blend in high humidity conditons. It is also an object to provide a polycarbonate and polyamide resin blend exhibiting.increased low temperature impact strength.

Another object of the present invention, while achieving the before stated objects, is to provide an inexpensive process for producing such polymer blends of polycarbonates and polyamides by the use of conventional mixing equipment.

The polymeric blends of the present invention possess the desired properties of each of the constituents forming the blend, namely, the blend has improved resistance to solvents and stress crack agents, a relatively high impact strength and heat distortion temperature, and the polymeric blends do not have an affinity to absorb moisture. Accordingly, the present invention utilizes to compatibilizing agents that provide a substantially homogenous blend of a polycarbonate and polyamide without substantial sacrifice of the desirable properties of the polycarbonate or polyamide resins. The blends further comprise a mono functional glycidal epoxide as a stabilizing agent. The epoxide effectively end caps the polyamide component of the blend and thus controls chain propagation. These mono functional glycidal epoxides are not subject to cross linking and thus they do not cause an increase in blend molecular weight. Furthermore, the mono functional glycidyl epoxy allows increased temperature processing of the blend while retaining blend impact strength. The polymeric blend may additionally comprise an impact modifying agent so as to increase the low temperature impact resistance of the blend.

The polymeric blend having the before-mentioned properties generally comprises from about 20 to about 80 weight percent of a polycarbonate having a molecular weight of from about 20,000 to about 40,000, from about 70 to about 10 weight percent of a linear polyamide having a molecular weight of at least about 2,000, from about 2 to about 20 weight percent of a polymeric compatabilizing agent having at least one functional group soluble in the polycarbonate and at least one functional group soluble in the polyamide, and from about 0.2 to about 2 weight percent of a monoglycidyl epoxy compound stabilizing agent.

The polymeric compatibilizing agent for such blends of polycarbonate and polyamide resins may be a compatibilizer compound of a polyetherimide; a polyurethane; a linear segmented thermoplastic elastomer having an ester segment and a hard segment of semi-crystalline, partially aromatic polyamide, based on diphenylmethane diisocyanate; a hydroxyl containing phenoxypolymer; a polyamide-polyarylate block copolymer; or a polyamide-polyester block polymer. Preferably, the melting or softening point of the compatibilizing agent is no greater than the melting or softening points of the polycarbonate and polyamide resin constituents of the blend. These agents may also be used alone (i.e., 100%), or in amount of from about 10 to 90 weight percent in combination with an impact modifying agent in an amount of from about 90 to about 10 weight percent with the optional addition of up to about 80 weight percent of an alloying agent.

In the present invention, utilization of the monoglycidyl epoxy compound for end-capping of the amide structure of the polyamide component, allows the blend to achieve improved stabilization as well as improved processing requirements. This mono functional epoxy provides for a reduced molecular weight blend which allows increased blend flow and processing speed at a given processing temperature, compared to blends utilizing a stabilizing agent which imparts cross linking. It is also possible to maintain equivalent flows as compared with prior art blends while utilizing less energy to maintain the equivalent flow.

Other objects, advantages and features of the present invention will become clear from the following detailed description when read in conjunction with the appended claims.

DETAILED DESCRIPTION OF THE PREFERRED EMBODIMENTS

The term "blend" as used herein is to be understood to signify a substantially homogeneous mass of materials, and the resulting extrudate, preferably in pellet form, which is obtained by heating such materials to the melting or softening point under high shear conditions in an extruder.

The polycarbonates which can be employed in the formulation of the blends of the present invention are well known in the art, and can be any suitable polycarbonate having a molecular weight of from about 20,000 to about 40,000. Similarly, the linear polyamides which can be employed in the formulation of the blends of the present invention are also well known in the art and embrace those semi-crystalline and, amorphous resins having a molecular weight of at least 2,000, commonly referred to as nylons. Desirably, the polyamide resins will have a molecular weight of at least about 5,000, and include such polyamides as polycaprolactam (6 nylon), polyhexamethylene adipamide (66 nylon), polyhexamethylene azelamide (69 nylon) and the like.

The compatibility agents used in the blends of the invention are generally block or other copolymers which function as an interfacial element between the two incompatible resin components. In order for the polycarbonate constituent to be compatible with the polyamide constituent of the blend the polymeric compatibilizing agent must have at least one functional group soluble in the polycarbonate and at least one functional group soluble in the polyamide. Further, since it is desirable that the blend be melt compounded it is important that the melting or softening point of the polymeric compatibilizing agent be no greater than the melting or softening point of the polycarbonate and polyamide constituents of the blend.

Any suitable compound satisfying the above-described criteria can be employed as the polymeric compatibilizing agent in the formulation of the polycarbonate-polyamide blends of the present invention. However, desirable results can be obtained when the polymeric compatibilizing agent is one of the compatibilizer compounds mentioned above.

In one embodiment of the invention, the polymeric compatibilizer compound is used alone with the polycarbonate and polyamide resins and stabilizer. In another embodiment, the compatibilizer agent comprises (a) from about 10 to 90, preferably between 15 and 75, and more preferably between 20 and 55 weight percent of the compatibilizer compound; (b) from about 90 to 10, preferably 75 to 20, and more preferably 60 to 40 weight percent of an impact modifying agent; and (c) from 0 to about 80, preferably 25 to 75, and more preferably 30 to 50 weight percent of an alloying agent.

According to another embodiment of the invention, the compatabilizing agent comprises mixtures of from about 25 to about 50 weight percent of the compatibilizing compound, from about 25 to about 50 weight percent of the impact modifying agent, and from 0 to about 50 weight percent of the alloying agent.

One suitable compatibilizer compound is a polyetherimide of the formula:

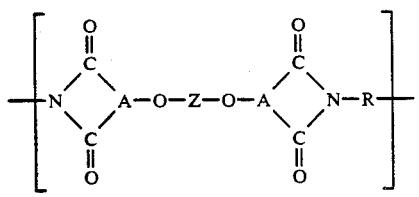

where a represents a whole number in excess of 1, e.g., 10 to 10,000 or more, the group —O—A is selected from:

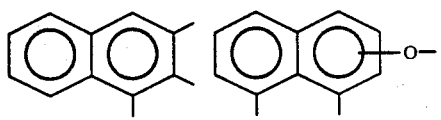

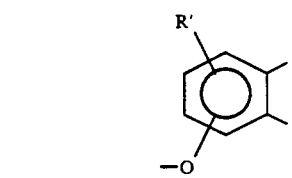

R' being hydrogen, lower alkyl or lower alkoxy, preferably the polyetherimide includes the latter —O—A group where R' is hydrogen such that the polyetherimide is of the formula:

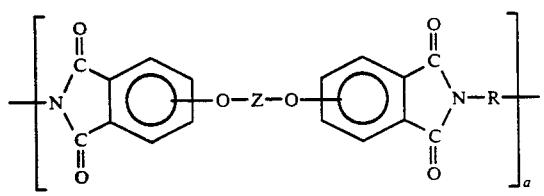

and the divalent bonds of the —O—Z—O radical are in the 3,3′;3,4′;4,3′ or the 4,4′ position; Z is a member of the class consisting of (1)

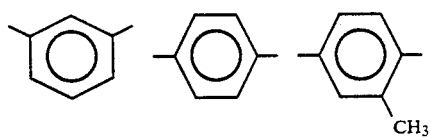

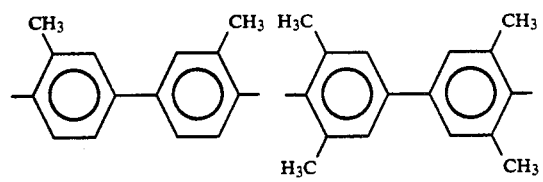

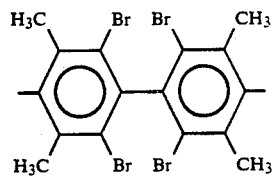

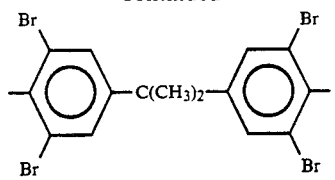

and (2) divalent organic radicals of the general formula:

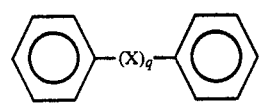

where X is a member selected from the class consisting of divalent radicals of the formulas:

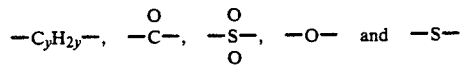

where q is 0 or 1, y is a whole number from 1 to 5; and R is a divalent organic radical selected from the class consisting of (1) aromatic hydrocarbon radicals having from 6-20 carbon atoms and halogenated derivatives thereof, (2) alkylene radicals and cycloalkylene radicals having from 2-20 carbon atoms, $C_{(2-8)}$ alkylene terminated polydiorganosiloxanes, and (3) divalent radicals included by the formula:

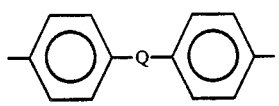

where Q is a member selected from the class consisting of

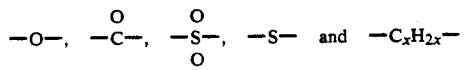

and x is a whole number from 1 to 5 inclusive. Particularly preferred polyetherimides for the purposes of the present invention include those where —O—A and Z respectively are:

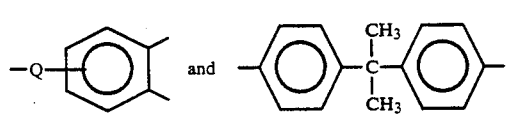

and R is selected from:

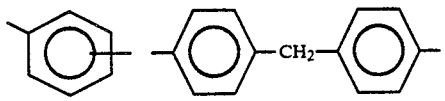

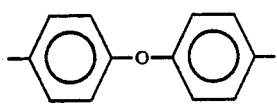

The polyetherimides where R is metaphenylene are most preferred.

The polyetherimide compatibilizer compounds can be obtained by any of the methods well know to those skilled in the art including the reaction of any aromatic bis(ether anhydrides) of the formula

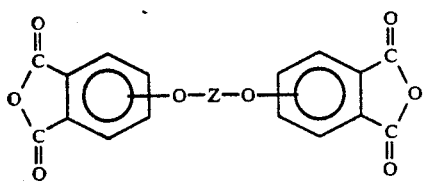

where Z is a defined hereinbefore with an organic diamine of the formula $$H_2N-R-NH_2$$

where R is as defined hereinbefore.

Aromatic bis(ether anhydride)s of the above formula include, for example, 2,2- (bis[4-(2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4' bis(2,3-dicarboxyphenoxy)diphenyl sulfone dianhydride; etc., 2,2-bis [4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy) diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'(3,4-dicarboxyphenoxy) diphenyl-2,2-propane dianhydride; etc., and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. Patent No. 257,010, issued Nov. 11, 1969. Also, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4' diaminodiphenyl propane, 4,4'-diaminodiphenyl methane, benzidine, 4,4'-diaminodiphenyl sulfide, 4,4'-diaminodiphenyl sulfone, 4,4'-diaminodiphenyl ether, 1,5-diaminonaphthalene, 3,3'-dimethylbenzidine, 3,3'-dimethoxybenzidine, 2,4'-bis(beta-amino-t-butyl)toluene, bis(p-beta-amino-t-butylphenyl)ether, bis(p-beta-methyl-o-aminophenyl) benzene, 1,3-diamino-4-isopropylbenzene, 1,2-bis(3-aminopropoxy)ethane, m-xylylenediamine, p-xylylenediamine, 2,4-diaminotoluene, 2, 6-diaminotoluene, bis(4-aminocyclohexyl)methane, 3-methylheptamethylene-diamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl) tetramethyldisiloxane, bis(4-aminobutyl)tetramethyl disiloxane, and the like, and mixtures of such diamines.

In general, the reactions can be advantageously carried out employing well-known solvents, e.g., o-dichlorobenzene, m-cresol/toluene, etc., in which to effect interaction between the dianhydrides and the diamines, at temperatures of from about 100° to about 250° C. Alternatively, the polyetherimides can be prepared by melt polymerization of any of the aforementioned dianhydrides with any of the aforementioned diamine compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity greater than 0.2 deciliters per gram, preferably 0.35 to 0.6 or 0.7 deciliters per gram or even higher when measured in m-cresol at 25° C.

Included among the many methods of making the polyetherimides are those disclosed in U.S. Pat. Nos. 3,847,867, 3,847,869, 3,850,885, 3,852,242 and 3,855,178. These disclosures are incorporated herein in their entirety by reference for the purpose of teaching, by way of illustration, general and specific methods for preparing polyetherimides suitable for the blends of this invention.

The polyurethanes which can be employed as compatibilizer compounds in the polycarbonate-polyamide blends of the present invention are characterized as polyester urethane elastomers or the reaction products of polyesters and diisocyanates having a melting point less than the processing range used for compounding the compositions of the invention, i.e. 480° F. to 550° F. Illustrative of such polyurethanes are "PS 195-300", "PN-03-100" and "PS 440-100" polyurethanes manufactured by K. J. Quinn Company, and the like.

Also useful as a compatibilizer compound is a linear segmented thermoplastic elastomer having an ester segment and a hard segment of semi-crystalline, partially aromatic polyamide, based on diphenylmethane diisocyanate (such as the elastomers marketed by Dow , Chemical Company under the trademark "Estamide 90A".

When a compatabilizing agent comprising 100% a hydroxyl containing phenoxypolymer is utilized, said compatabilizer does not contain a carboxylic acid and is a non-corrosive compound which increases the paint adhesion of the blend to high humidity conditions.

The hydroxyl containing polymers which may be used as compatibilizer compounds in the blends of the present invention includes those known to the art, including especially Phenoxy which is a hydroxy containing polymer based on epichlorohydrin-bisphenol, a copolymer of Union Carbide. This compound has the following structure:

The polyamide-polyarylate block copolymers which are useful as compatibilizer compounds in the blends of the present invention are disclosed in U.S. Pat. No. 4,788,248, the content of which is expressly incorporated herein by reference thereto.

The polyamide-polyester block copolymers which are useful as compatibilizer compounds in the blends of the present invention are disclosed in U.S. Pat. No. 4,788,249, the content of which is expressly incorporated herein by reference thereto.

It is especially suitable to employ monofunctional epoxy compounds as the stabilizer for these blends for the reasons given above. One preferred monoglycidyl epoxy compound is a butyl glycidyl ether of the formula:

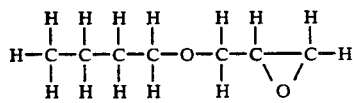

Allyl glycidyl ether and tertiary-butyl glycidyl ether are also especially suited for use as the monoglycidal epoxy compound. These compounds are illustrated by the following formulae:

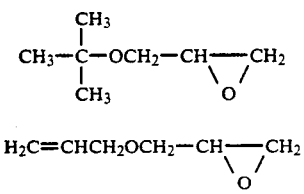

The impact modifying agent which may be used in the blends of of the invention include any polymer which is compatible with at least one of the resin components of the blend. Generally, these polymers are branched or straight chain polymers having a tensile modulus in the range of 1 to 20,000 psi. Suitable polymers are disclosed in U.S. Pat. No. 4,174,358, the content of which is expressly incorporated herein by reference thereto.

These impact modifying agent may also be any one of a number of graft polymers. These polymers include various elastomers which are grafted with an alpha-beta unsaturated carboxylic acid or anhydride derivative thereof. For simplicity, maleic acid or maleic anhydride is preferred for use in preparing these graft polymers.

The maleic anhydride grafted polymers may include blends of maleic anhydride grafted polypropylene, and maleic anhydride grafted ethylene propylene rubber or ethylene-propylene-diene monomer terpolymers. These blends can be prepared by any suitable grafting techniques known in the art. Further, the amount of the maleic anhydride grafted polypropylene and the maleic anhydride ethylene-propylene rubber present in the grafted polymeric blend constituent of the impact agent can vary widely. However, the maleic anhydride grafted polypropylene rubber will generally be present in the grafted polymeric blend in a weight ratio of from about 0:1 to 5:2, preferably in a ratio of between 1:3 to 3:1, and most desirably in a weight ratio of about 3:2.

The alloying agent which may be utilized as one of the constituents of the polymeric compatibilizing agent in the polycarbonate-polyamide blends can be any suitable alloying agent which is compatible with the polycarbonate, the polyamide and the other constituents comprising the polymeric compatibilizing agent. Generally, the alloying agents which can be employed as a constituent of the polymeric compatibilizing agent are characterized as thermoplastic resins compatible with either the polyamide, the polycarbonate, or both, and which improves properties of the overall polymeric blends of the invention, such as cost, impact strength, and processability. Examples of such thermoplastic resins which can be employed as the alloying agent are acyrlonitrile-butadiene-styrene terpolymers, styrene-maleic anhydride copolymers, polyester elastomers, methacrylate-butadiene-styrene terpolymers, polymethylmethacrylate, styrene-ethylene/butylene-styrene copolymers, nitrile rubber, ionomers of polyethylene, polyether block amides, polyphenylene oxide polymers and the like, as well as mixtures thereof.

A convenient method for preparing the polymeric blends of polycarbonates and polyamides of the present invention is to premix the constituents, (that is, the polycarbonate, polyamide, polymeric compatibilizing agent and stabilizer) in the proper weight proportions and in finely divided form to produce a substantially homogeneous dry mixture which is then introduced into a compounding extruder, heated to a molten mass and extruded. Desirably, the ingredients, in a powder or granule state, are blended in a low intensity mixer, such as a ribbon blender, for an effective period of time until a substantially uniform or homogeneous mixture is provided. While the amount of time required to produce the substantially homogeneous mixture can vary widely, desirable results have been obtained when the mixing of the dry ingredients in the ribbon blender is from about 2 to about 5 minutes, and more desirably from about 2 to about 3 minutes.

The dry-blended mixture is fed to a compounding extruder, which serves to heat the mixture to a substantial homogeneous plasticized mass, which plasticized mass is then extruded through the die head of the extruder into strands and is thereafter chopped into pellets.

A single screw or twin screw extruder or reciprocating mixer, such as a Buss kneader, can be utilized as the compounding extruder. However, a twin screw extruder, such as a Werner Pfleider WP ZSK 83 or Werner Pfleider ZSK 90 twin screw extruder, is preferred because of the high shear obtained on the molten mass in the extruder. In addition, high screw speeds are desired, such as from about 100 to about 300 rpm, to insure that the molten mass is subjected to high shear and to further insure substantially uniform mixing of the constituents of the molten mass.

The compounding extruder is operated at a temperature and pressure sufficient to melt the constituents forming the blend and produce a molten mass which can be extruded. Generally, the compounding extruder is operated at a temperature of from about 480° F. to 550° F. and at a pressure of from about 500 psi to 1500 psi, and more desirably at a temperature of about 500° F. and at a pressure of about 1000 psi.

The molten homogeneous mass is advanced through the compounding extruder to the die head where the plasticized homogeneous mass is extruded through a plurality of orifices in the die head into an atmospheric environment as strands. The die head of the compounding extruder is maintained at the same temperature that the molten mass is heated to in the compounding extruder, such as a temperature of from about 480° F. to 550° F.

As previously stated, the extrudate comprises a plurality of strands. The strands are thereafter chopped into pellets. The pelletizing of the extrudate can be accomplished by a strand cut pelletizer, such as a Cumberland pelletizer (where cooling is accomplished in a water bath prior to feeding the strands through the pelletizer), or by an underwater pelletizer, such as a Gala Unit (where the pellets are cut at the die face). The pelletized polymeric blend of a polycarbonate and a polyamide can thereafter be utilized as feedstock in the fabrication of desired articles through either a molding or extrusion process. Such molding and extrusion processes are well known in the art.

The melt compounded blend of the polycarbonate, polyamide compatibilizing agent and stabilizer prepared in accordance with the procedure set forth above has been found to possess the desired properties of each of the constituents, while substantially eliminating the undesirability properties of such constituents.

EXAMPLES

In order to more fully describe the present invention, the following examples are set forth. However, it is to be understood that the examples set forth below are for illustrative purposes only and is not to be construed as limiting the scope of the present invention as defined by the appended claims.

A series of experiments were conducted on articles molded of polymeric material to determine the chemical and physcial properties of the polymeric materials. The polymeric resins used in the fabrication of the articles tested were in a powder of granular state, and were dry blended in a ribbon blender for approximately 3 minutes to insure that the constituents were thoroughly mixed and that a substantially uniform or homogenous mixture was obtained.

The dry blended mixture was then fed to a twin screw compounding extruder (i.e., a Warner Pfleider 65 WP ZSK 83 extruder) which was operated at approximately 1000 psi and had a production rate of 200 lbs/hr. and a residence time in the extruder of approximately 3 minutes. The screw speed, which was independently controlled relative to the output rate of the extruder, was 150 RPM to insure that a high shear was produced on the molten polymeric mass. The molten polymer mass or blend was extruded through the die head of the compounding extruder form of strands. The strands were passed through a water bath to cool the strands, and thereafter the strands were cut into pellets with a Cumberland pelletizer.

A typical temperature profile of the compounding extruder, which progressively increases from intake to the die head so as to insure proper melting and mixing of the polymeric constituents and form a substantially homogeneous blend thereof, is as follows:

| Feed | Transition | Metering | Die Hard |
|---|---|---|---|
| 460° F. | 480° F. | 480° F. | 480° F. |

The pellets obtained from each of the experiments were then molded into articles so that the chemical and physical properites of the polymeric materials, and thus articles fabricated therefrom, could be determined.

EXAMPLE 1

Table I set forth herein contains a comparative compilation of the test data relating to the improved physical properties which have been attained by the utilization of a monogylcidyl epoxy compound, butyl glycidyl ether (BGE), as one of the constituents of the polymeric blend.

As discussed above, many processing applications utilizing polycarbonate and polyamide blends require the blend to flow into, and substantially fill finely detailed, sharply angled areas of a mold. Increased processing temperatures are necessary to reduce the viscosity of the blend so that flow into these areas is possible. As illustrated in Table I below, blends utilizing the monoglycidyl epoxy stabilizer of the present invention are able to sustain such increased processing temperatures without the associated decrease in impact strength associated with prior art blends.

EXAMPLE 2

The physical properties of polycarbonate polyamide blends comprising phenoxy and maleated ethylene-propylene rubber compatabilizer blends, (No. 1 and No. 2), were compared with polycarbonate polyamide blends comprising a 100% phenoxy (contol 2) and a 100% maleated ethylene-propylene rubber compatabilizer containing neither phenoxy nor maleated rubber, (control 1).

TABLE I

|  | CONTROL 1 | CONTROL 2 | CONTROL 3 | CONTROL 4 | TEST #1 | TEST #2 | TEST #3 | TEST #4 |
|---|---|---|---|---|---|---|---|---|
| Material Used |  |  |  |  |  |  |  |  |
| Polycarbonate | 45.7 | 45.7 | 45.7 | 45.7 | 45.9 | 45.9 | 45.7 | 45.7 |
| Nylon 6 | 39.0 | 39.0 | 39.0 | 39.0 | 39.0 | 39.0 | 39.0 | 39.0 |
| Estamide* | 5.0 | 5.0 | 5.0 | 5.0 | 5.0 | 5.0 | 5.0 | 5.0 |
| Maleic anhydride polymeric blend** | 7.3 | 7.3 | 7.3 | 7.3 | 7.3 | 7.3 | 7.3 | 7.3 |
| Other Additives | 2.6 | 2.6 | 2.7 | 2.7 | 2.6 | 2.6 | 2.6 | 2.6 |
| (%) of Stabilizer | 0.4 | 0.4 | 0.3 | 0.3 | 0.2 | 0.2 | 0.4 | 0.4 |
| Type of Stabilizer | diglycidyl epoxy | diglycidyl epoxy | Boric Acid | Boric Acid | BGE | BGE | BGE | BGE |
| Properties Tested |  |  |  |  |  |  |  |  |
| Processing Temp (°F.) | 520 | 570 | 520 | 570 | 520 | 570 | 520 | 570 |
| Flexural Modulus (K psi) | 260 | 275 | 275 | 300 | 300 | 300 | 310 | 280 |
| Flexural Strength (psi) | 10,800 | 11,330 | 11,330 | 11,710 | 11,900 | 12,170 | 12,130 | 10,980 |
| Tensile Strength (psi) | 7,520 | 7,600 | 7,600 | 7,600 | 7,680 | 7,520 | 7,740 | 7,570 |

TABLE I-continued

|  | CONTROL 1 | CONTROL 2 | CONTROL 3 | CONTROL 4 | TEST #1 | TEST #2 | TEST #3 | TEST #4 |
|---|---|---|---|---|---|---|---|---|
| Elongation (%) | 120 | 53 | 53 | 25 | 126 | 118 | 109 | 110 |
| Weld Line Strength (psi) | 6,000 | 5,280 | 5,280 | 2,800 | 5,790 | 5,790 | 5,760 | 6,270 |
| Weld Line Elongation (%) | 4.5 | 3.3 | 3.3 | 2.0 | 3.8 | 4.0 | — | 4.7 |
| Notched Izod (ft-lb/in) | | | | | | | | |
| ⅛" | 18.2 pb | 18.2 pb | 14.1 pb | 6.9 cb | 18.4 pb | 19.0 pb | 16.6 pb | 17.9 pb |
| ¼" | 14.4 hb | 3.6 cb | 4.0 cb | 1.6 cb | 12.8 pb | 14.1 pb | 13.8 pb | 13.0 pb |
| Gardner Impact (in-lbs) | | | | | | | | |
| 23° C. | >320 | >320 | >320 | >320 | >320 | >320 | >320 | 250 |
| −30° C. | >320 | >320 | >320 | >320 | >320 | >320 | >320 | 250 |
| Melt Index (g/10 min.) (250 C, 3,800 g) | 6.4 | | 15.0 | | 7.9 | | 8.7 | |

*Estamide is a linear segment thermoplastic elastomer having an ester segment and a hard segment of semi-crystalline, partially aromatic polyamide, based on diphenylmethane diisocyanate and marketed by Dow Chemical Company under the trademark "Estamide 90A".
**The maleic anhydride grafted polymeric blend is a polymeric blend containing 3 parts by weight maleic anhydride grafted polypropylene and 2 parts by weight maleic anhydride grafted ethylene-propylene rubber.

TABLE II

Composition of Polymeric Materials (weight percent)

| Polymeric Constituent | Control | Control | No. 1 | No. 2 |
|---|---|---|---|---|
| POLYCARBONATE | 50 | 45 | 45 | 57 |
| NYLON 6 | 50 | 45 | 45 | 31 |
| PHENOXY PKHC | — | 10 | 5 | 4 |
| MALEATED EP RUBBER | 0 | — | 5 | 8 |
| STABILIZER (BGE) | 0.4 | 0.4 | 0.4 | 0.4 |

TABLE III

| Physical Properties | Polymer Identification | | | |
|---|---|---|---|---|
| | Control | Control | No. 1 | No. 2 |
| TENSILE STRENGTH (PSI) | NG | NG | 7,600 | 7,700 |
| ELONGATION (%) | NG | NG | 100 | 90 |
| FLEXURAL MODULUS (KSI) | NG | NG | 290 | 305 |
| NOTCHED IZOD (FT LB/IN) | NG | NG | 8.2 | 13.9 |
| GARDNER IMPACT −30° C. (IN/LBS) | NG | NG | 75 | 320 | p Table II sets forth the composition of each of the polymeric materials. Table III is a compilation of test data relating to physical properties of each of such polymeric materials. As illustrated by the data in Table III, the compatabilizer blend comprising maleated ethylene-propylene rubber and phenoxy demonstrates overall improvement in toughness.

The above data clearly indicates the improved physical and chemical properties imparted to the polymeric blends of the present invention, and thus to articles fabricated from such polymeric blends. Further, the use of the BGE stabilizer allows these formulations to be molded or otherwise processed at higher temperatures, since the BGE stabilizer improves the rheology of the formulations.

While it is apparent that the invention herein disclosed is well calculated to fulfill the objects above stated, it will be appreciated that numerous embodiments and modification may be devised by those skilled in the art, and it is intended that the appended claims cover all such modification and embodiments as fall within the true spirit and scope of the present invention.

What is claimed is:

1. A polycarbonate and polyamide melt compounded blend having improved chemical and physical properties, said blend consisting essentially of:

a polycarbonate resin in an amount sufficient to impart a heat distortion temperature of at least about 200° F. to the blend:

a polyamide in an amount sufficient to impart to the blend chemical resistance against solvents and stress cracking agents as well as an impact strength of at least 15 foot-pounds when measured by the notched izod test;

a polymeric compatibilizing agent comprising a compatibilizing compound having at least one functional group soluble in said polyamide and one functional group soluble in said polycarbonate, in an amount sufficient to provide a substantially uniform polymeric blend, wherein the melting point or softening point of the polymeric compatibilizing agent is no greater than the melting or softening point of the polycarbonate and polyamide components of the blend; and a monoglycidyl epoxy compound as a stabilizer for the blend selected from the group of butyl glycidyl ether, allyl glycidyl ether, and t-butyl glycidyl ether.

2. The blend of claim 1 wherein the polycarbonate resin is present in an amount of from about 20 to 80 weight percent;

the polyamide is present in an amount of from about 70 to 10 weight percent;
the polymeric compatibilizing agent is present in an amount of from about 20 to 2 weight percent; and
the monoglycidyl epoxy compound is present in an amount of from about 0.2 to 2 weight percent.

3. The blend of claim 1 wherein the polycarbonate has a molecular weight of from about 20,000 to 40,000, and the polyamide is a linear polyamide having a molecular weight of at least about 2,000.

4. The blend of claim 3 wherein the linear polyamide has a molecular weight of at least about 5,000 and is a poly-hexamethylene adipamide, polyhexamethylene azelamide or polycaprolactam.

5. The blend of claim 1 wherein the compatibilizing compound is a polyertherimide, a polyurethane, a linear segmented thermoplastic elastomer, a hydroxyl containing phenoxypolymer, a polyamide-polyarylate block copolymer, or a polyamide-polyester block copolymer.

6. The blend of claim 1 wherein said polymeric compatibilizing agent is a mixture of:

from about 10 to 90 weight percent of a compatibilizing compound of a polyetherimide, a polyurethane, a linear segmented thermoplastic elastomer, a hydroxyl containing phenoxypolymer, or a polyamide-polyester block copolymer.;

from about 90 to 10 weight percent of an impact modifying agent; and from about 0 to 80 weight percent of an alloying agent.

7. The blend of claim 6 wherein the compatibilizing compound is present in an amount from about 15 to 75 weight percent, and the impact modifying agent is present in an amount from about 75 to 20 weight percent, the alloying agent is present in an amount from about 25 to 75 weight percent, all weight percents based on the weight of the polymeric compatibilizing agent.

8. The blend of claim 6 wherein the impact modifying agent is a branched or straight chain polymer having a tensile modulus in the range of 1 to 20,000 p.s.i.

9. The blend of claim 8 wherein the impact modifying agent is a maleic anhydride grafted polymer or polymeric blend.

10. The blend of claim 9 wherein said maleic anhydride grafted polymer is maleic anhydride grafted polypropylene, maleic anhydride grafted ethylene-propylene or a maleic anhydride grafted ethylene-propylene-diene terpolymer.

11. The blend of claim 9 wherein said maleic anhydride grafted polymeric blend is a mixture of maleic anhydride grafted polypropylene and maleic anhydride grafted ethylene-propylene rubber in a weight ratio of from about 0:1 to about 5:2.

12. The blend of claim 6, wherein the alloying agent is present in an amount of at least about 5 weight percent and is an acrylonitrilebutadiene-styrene terpolymer, styrene-maleic anhydride copolymer, polyester elastomer, methacrylate-butadiene-styrene terpolymer, polymethylmethacrylate, styrene-ethylene/butylene-styrene copolymer, nitrile rubber, ionomer of polyethylene, polyether block amide, or polyphenylene oxide polymer.

13. The blend of claim 11 wherein said mixture of maleic anhydride grafted polypropylene and maleic anhydride grafted ethylene-propylene rubber is present in the compatibilizing agent in an amount of from about 75 to 20 weight percent, and said mixture contains from about 1 to 3 parts by weight of maleic anhydride grafted polypropylene and from about 3 to 1 parts by weight of maleic anhydride grafted ethylene-propylene rubber.

14. The blend of claim 11 wherein said maleic anhydride grafted polymeric blend is present in the compatibilizing agent in an amount of from about 60 to 40 weight percent, and said maleic anhydride grafted polymeric blend contains abut 3 parts by weight of maleic anhydride grafted polypropylene and about 2 parts by weight of maleic anhydride ethylene-propylene rubber.

15. A polycarbonate and polyamide containing melt compounded blend having improved chemical and physical properties, said blend consisting essentially of:

from about 20 to 80 weight percent of a polycarbonate having a molecular weight from about 20,000 to 40,000;

from about 70 to 10 weight percent of a linear polyamide having a molecular weight of at least 2,000;

from about 20 to 2 weight percent of a polymeric compatibilizing agent; and from about 0.2 to 2 weight percent of a monoglycidyl epoxy compound as a stabilizer for the blend selected from the group of butyl glycidyl ether, allyl glycidyl ether, and t-butyl glycidyl ether.

16. The blend of claim 15 wherein said linear polyamide has a molecular weight of at least about 5000 and is a polyhexamethylene adipamide, polyhexamethylene azelamide or polycaprolactam.

17. The blend of claim 15 wherein said polymeric compatibilizing agent is a polyetherimide, a polyurethane, a hydroxyl containing phenoxypolymer, a linear segmented thermoplastic elastomer, a polyamide-polyarylate block copolymer, or a polyamide-polyester block copolymer.

18. The blend of claim 15 wherein said polymeric compatibilizing agent is a mixture of:

from about 15 to 75 weight percent of the compatibilizer compound of from about 75 to 20 weight percent of a maleic anhydride grafted polymeric blend of maleic anhydride grafted polypropylene and maleic anhydride grafted ethylene-propylene rubber; and from about 25 to 75 weight percent of an alloying agent.

19. The blend of claim 15 wherein said polymeric compatibilizing agent is a mixture:

from about 20 to 55 weight percent of a compatibilizer compound of polyetherimide, polyurethane, a linear segmented thermoplastic elastomer having an ester segment and a hard segment of semi-crystalline, partially aromatic polyamide based on diphenylmethane diisocyanate, a hydroxyl containing phenoxypolymer, and a polyamide-polyarylate block copolymer or a polyamide-polyester block copolymer;

from about 60 to 40 weight percent of a maleic anhydride grafted polymeric blend of maleic anhydride grafted polypropylene and maleic anhydride grafted ethylene-propylene rubber; and from about 30 to 50 weight percent of an alloying agent.

20. The blend of claim 19 wherein the maleic anhydride grafted polypropylene and the maleic anhydride grafted ethylene-propylene rubber are present in a weight ratio of from about 0:1 to about 5:2 parts by weight.

21. The blend of claim 19 wherein the maleic anhydride grafted polypropylene and the maleic anhydride grafted ethylene-propylene rubber are present in a weight ratio of 3:2 parts by weight.

22. The blend of claim 18 wherein the alloying agent is an acrylonitrile-butadiene-styrene terpolymer, polymethyl methacrylate, styrene-ethylene/butylene-styrene copolymer, nitrile rubber, an ionomer of polyethylene, a polyether block amide, or a polyphenylene oxide polymer.

23. The blend of claim 18 wherein said maleic anhydride grafted polymeric blend contains about 3 parts by weight of maleic anhydride grafted polypropylene and about 2 parts by weight of maleic anhydride grafted ethylene-propylene rubber.

24. A polycarbonate and polyamide melt compounded blend having improved chemical and physical properties, said blend consisting essentially of:

from about 20 to about 90 weight percent of a polycarbonate having a molecular weight of from about 20,000 to 40,000;

from about 70 to 10 weight percent of a linear polyamide having a molecular weight of at least 2,000;

from about 20 to 2 weight percent of a polymeric compatibilizing agent comprising at least one functional group soluble in said polyamide and one functional group soluble in said polycarbonate so as to form a homogeneous blend with said polycarbonate and said polyamide components, said polymeric compatibilizing agent comprising from about 10 to 90 weight percent of a compound selected from the group consisting of a polyurethane, a polyetherimide, a linear segmented thermoplastic elastomer, a hydroxyl containing phenoxypolymer, a polyamide-polyarylate block copolymer and a polyamide-polyester block copolymer, from 90 to about 10 weight percent of an impact modifying compound selected from the group consisting of a maleic anhydride grafted polypropylene, maleic anhydride ethylene propylene material, a maleic anhydride grafted ethylene-propylene-diene monomer terpolymer and a maleic anhydride grafted polymeric blend; and from about 5 to 80 percent of an alloying agent comprising a compound selected from the group consisting of acrylonitrile-butadiene-styrene terpolymer, polymethyl methacrylate, styrene-ethylene/butylene-styrene copolymer, nitrile rubber, an ionomer of polyethylene, polyether block amide and polyphenylene oxide polymer; and from about 0.2 to 2 weight percent of a monoglycidyl epoxy compound selected from the group of butyl glycidyl ether, allyl glycidyl ether, and t-butyl glycidyl ether.

* * * * *